(12) United States Patent
Georgitsis et al.

(10) Patent No.: US 7,600,643 B2
(45) Date of Patent: Oct. 13, 2009

(54) SORTING METHOD AND APPARATUS

(75) Inventors: Nikolaos Georgitsis, Hamburg (DE); Rüdiger Kliefoth, Ronnenberg (DE)

(73) Assignee: Mettler-Toledo Garvens GmbH, Giesen (DE)

(*) Notice: Subject to any disclaimer, the term of this patent is extended or adjusted under 35 U.S.C. 154(b) by 123 days.

(21) Appl. No.: 11/641,299

(22) Filed: Dec. 18, 2006

(65) Prior Publication Data

US 2007/0138067 A1  Jun. 21, 2007

(30) Foreign Application Priority Data

Dec. 16, 2005  (DE) .................. 10 2005 060 308

(51) Int. Cl.
 *B07C 1/00* (2006.01)
(52) U.S. Cl. .................. 209/657; 209/57; 209/552; 209/656
(58) Field of Classification Search .............. 209/57, 209/552, 656, 657
See application file for complete search history.

(56) References Cited

U.S. PATENT DOCUMENTS

| | | | | |
|---|---|---|---|---|
| 2,746,603 A | * | 5/1956 | Blondelle | ............... 209/172.5 |
| 3,189,342 A | | 6/1965 | Bocock | |
| 3,631,979 A | | 1/1972 | Sauerlach | |
| 3,661,255 A | | 5/1972 | Toth | |
| 3,750,881 A | * | 8/1973 | Husome et al. | ............. 209/546 |
| 4,353,467 A | * | 10/1982 | Harzenmoser | ............... 209/559 |
| 4,356,908 A | | 11/1982 | Embro, Jr. | |
| 5,423,431 A | * | 6/1995 | Westin | ....................... 209/539 |
| 2007/0138067 A1 | * | 6/2007 | Georgitsis et al. | ........... 209/552 |

FOREIGN PATENT DOCUMENTS

| | | |
|---|---|---|
| DE | 436686 | 3/1925 |
| DE | 2741788 B1 | 1/1979 |
| DE | 3013315 C2 | 3/1981 |
| DE | 2952411 C2 | 5/1981 |
| DE | 4129612 A1 | 3/1993 |
| DE | 20205312 U1 | 10/2002 |
| EP | 0783448 B1 | 7/1997 |
| JP | 09077324 | 3/1997 |
| JP | 2006273480 | 10/2006 |
| WO | 9957687 | 11/1999 |
| WO | 2005095904 A1 | 10/2005 |

\* cited by examiner

*Primary Examiner*—Patrick H Mackey
*Assistant Examiner*—Terrell H Matthews
(74) *Attorney, Agent, or Firm*—Schwabe, Williamson & Wyatt, P.C.

(57) ABSTRACT

Method to sort products whereby the products are transported along a path of conveyance in a conveying device, automatically checked during transport according to at least two predetermined sorting criteria, and when one of the criteria is met, automatically diverted by a diverting force out of the path of conveyance perpendicular to the direction of conveyance into a receiving area, whereby the diverting force proceeds from a common center independent of the fulfilled criterion on the basis of which the respective product is to be diverted, and a device suitable for implementing this method as well as a container for receiving the rejected products.

17 Claims, 9 Drawing Sheets

SORTING METHOD AND APPARATUS

CROSS-REFERENCE TO RELATED APPLICATION

The present application claims International Priority under 35 U.S.C. § 119 to co-pending German Patent Application No. 10 2005 060 308.4, filed Dec. 16, 2005, entitled "Sortierverfahren und Sortievorrichtung"; the entire content and disclosure of which are hereby incorporated by reference in its entirety.

TECHNICAL FIELD

Embodiments of the invention relate to apparatus and methods for sorting products. More particularly, various embodiments relate to techniques for automatically checking and diverting products according to at least two predetermined sorting criteria.

BACKGROUND

Various sorting methods may be used to reject products that do not have desired product characteristics, such as product weight (too heavy or too light) and/or package shape (open flap and/or crushed packaging). Products that do not have the desired characteristics are diverted from the path of conveyance and may enter a collection zone where they can be collected in containers.

Often multiple sorting criteria are specified corresponding to desired product characteristics to help determine which products should be rejected or diverted while they are being transported along the path of conveyance. If it is found that a product does not have all of the desired product characteristics, the nonconforming product may be rejected and diverted from the path of conveyance.

Generally, sorting methods in which multiple predetermined sorting criteria are used to sort the products, the sorting criteria are sequentially applied to the product and subsequently diverted. As such, the products are initially checked according to a first predetermined sorting criterion, and respective non-complaint products are then diverted from the path of conveyance by a suitable device. After this check, only those products continue to be transported that meet the desired product characteristics of the first sorting criterion. Subsequently, downstream along the conveying device, the products are checked further, in accordance with a second predetermined sorting criterion. Products that do not satisfy the second predetermined sorting criteria are subsequently diverted from the path of conveyance by another suitable device. Accordingly, after the products on the path of conveyance have been evaluated by each of the predetermined sorting criteria and any non-compliant products have been appropriately diverted, all remaining products still being transported should possess the desired product characteristics.

Often the path of conveyance required for sequential sorting in accordance with multiple predetermined sorting criteria is comparatively long. Unfortunately, as the construction and/or required space are often extensive for such sequential sorting there is frequently insufficient space to set up corresponding sorting devices with the necessary receiving areas.

SUMMARY

Accordingly, one embodiment of the invention provides a less extensive sorting apparatus and method that overcome the hereinafore-mentioned disadvantages of the heretofore-known devices of this general type and that the diverting force proceeds from a common center independent of the fulfilled criterion on the basis of which the respective product is to be diverted.

With the foregoing and other items in view, there is provided, in accordance with one embodiment of the invention, a method to sort products. The method includes transporting the products along a path of conveyance by a conveying device. The method further includes automatically checking, during the transporting, at least two predetermined sorting criteria. Upon satisfying at least one of the sorting criteria, the method also includes automatically diverting the product out of the path of conveyance by a diverting force perpendicular to the direction of conveyance into a receiving area, the diverting force proceeding, independent of the satisfied criterion, from a common center based on where the respective product is to be diverted.

In accordance with another mode of one embodiment of the invention, the diverting proceeds from a common diverting site in the path of conveyance, independent of the satisfied criterion, based on which of the respective products is to be diverted. In accordance with a further mode of one embodiment of the invention, the diverting proceeds from the diverting site along a common transverse path. In accordance with an added mode of one embodiment of the invention, the diverted products are automatically branched off from the transverse path into separate sub-areas of the receiving area depending on criterion satisfied by the respectively diverted product. In accordance with an additional mode of one embodiment of the invention, the branches are sequential in reference to a transverse direction of the transverse path. In accordance with yet another mode of one embodiment of the invention, the branches are to left and/or right in reference to a transverse direction of the transverse path.

In accordance with yet a further mode of one embodiment of the invention, the diverted products are received into the receiving area by a movement triggered by gravity.

In accordance with yet an added mode of one embodiment of the invention, the checking includes weighing the transported products along the path of conveyance and determining, according to at least one of the sorting criteria, whether a measured weight deviates from a predetermined target weight. In accordance with yet an additional mode of one embodiment of the invention, the determining includes, according to a first sorting criterion, whether the measured weight lies above a target weight and, according to a second criterion, whether the measured weight lies below the target weight.

In accordance with a concomitant mode of one embodiment of the invention, there is provided optical measuring of a characteristic of the product shape, while the product is being transported along the path of conveyance, and wherein the checking includes determining, according to at least one of the sorting criterion, whether the measured shape characteristic deviates from a predetermined shape characteristic.

With the items of at least one embodiment of the invention in view, there is also provided a container to receive and separate various rejected products diverted from a common center. The container including a first chamber configured to receive a first product rejected by a sorting device from a plurality of products passing through the sorting device when a first sorting criteria is met. The container further including a second chamber, separate from the first chamber, configured to receive a second product rejected by the sorting device from the plurality of products passing through the sorting device when a second sorting criteria is met. The container also including a shunt, coupled to the first chamber and to the second chamber, having a first operating position and a second operating position, the shunt configured to control, as a function of the first and second sorting criteria, access to the first chamber and block access to the second chamber by the first rejected product in the first operating position and to control access to the second chamber and block access to the second chamber by the second rejected product in the second operating position.

In accordance with another feature of one embodiment of the invention, the shunt can pivot on a swivel axis that is essentially parallel to the direction of gravity, and the two operating positions of the shunt correspond to a left/right branching of the rejected products in reference to a plane defined by the direction running through the swivel axis and a plane defined by the direction perpendicular to the swivel axis. In accordance with a further feature of one embodiment of the invention, the swivel axis of the shunt runs along an edge of the shunt defined by an angle section.

In accordance with an added feature of one embodiment of the invention, the shunt can pivot on a swivel axis that is perpendicular to the direction of gravity, and the two operating positions of the shunt correspond to a sequential branching of the rejected products in reference to a plane defined by the direction running through the swivel axis and a plane defined by the direction perpendicular to the swivel axis. In accordance with an additional feature of one embodiment of the invention, the swivel axis of the shunt runs along an edge of the shunt defined by an angle section.

In accordance with yet another feature of one embodiment of the invention, there is provided a drive configured to move the shunt to assume a desired operating position. In accordance with yet a further feature of one embodiment of the invention, the drive includes a pneumatically movable pistons/cylinder configuration. In accordance with yet an added feature of one embodiment of the invention, the piston/cylinder configuration is rotatably mounted on an axis that runs parallel to a pivot axis.

In accordance with yet an additional feature of one embodiment of the invention, the drive includes a tensile actuator that compresses under pressure. In accordance with again another feature of one embodiment of the invention, the tensile actuator is rotatably mounted on an axis that runs parallel to a pivot axis.

In accordance with again a further feature of one embodiment of the invention, the drive is coupled to the shunt by means of a lever arm contacting the shaft of the shunt that extends in the direction of the swivel axis. In accordance with again an added feature of one embodiment of the invention, the lever arm has two arms, a first tensile actuator is clamped between one arm of the lever arm and a container-side fixed point, and a second tensile actuator is clamped between the other arm of the lever arm and a container-side fixed point so that pressure on the first tensile actuator generates torque in reference to the swivel axis in a first direction, and pressure on the second tensile actuator generates torque in a second direction opposite that of the first direction. In accordance with a concomitant feature of one embodiment of the invention, the lever arm has several attachment areas for coupling to the drive.

With the objects of one embodiment of the invention in view, there is also provided an apparatus to sort products. The apparatus including a conveying device configured to transport the products to be sorted along a path of conveyance in a direction of conveyance. The apparatus also including a checking device configured to check the products according to at least two sorting criteria. The apparatus further including a diverting device, coupled to the checking device and the conveying device, configured to exert a diverting force perpendicular to the direction of conveyance on a checked product meeting one of the at least two sorting criteria to divert the checked product out of the path of conveyance toward a receiving area, the diverting device exerting the diverting force, based on which of the respective products is to be diverted, from a common center, independent of which criterion was fulfilled.

In accordance with another feature of one embodiment of the invention, the diverting device has precisely one pusher that generates the diverting force.

In accordance with a further feature of one embodiment of the invention, the diverting device is configured so that products to be diverted are diverted at a common diverting site, independent of the fulfilled criteria, in the path of conveyance based on the respective product to be diverted. In accordance with an added feature of one embodiment of the invention, the diverting device applies torque to the products to be diverted that is perpendicular to the direction of conveyance so that the traverse an essentially equivalent path from the diverting site to the receiving area.

In accordance with an additional feature of one embodiment of the invention, the check device has a weighing device to weigh the products, and one of the sorting criteria is whether the measured weight deviates from a predetermined target weight.

In accordance with yet another feature of one embodiment of the invention, the test device has an optical measuring device to measure a shape characteristic of the product, and one of the sorting criteria is whether the measured shape characteristic deviates from a predetermined shape characteristic. In accordance with yet a further feature of one embodiment of the invention, the optical measuring device is before, in the direction of conveyance, a weighing device of the check device.

In accordance with yet an added feature of one embodiment of the invention, the receiving area has a container along the path of conveyance. In accordance with a concomitant feature of one embodiment of the invention, the path of conveyance has a belt section formed by a weighing conveyor belt that is downstream from a supply belt section and upstream from a removal belt section, and in particular the container is located along the removal belt section.

Other features that are considered as characteristic for at least one embodiment of the invention are set forth in the appended claims.

Although various embodiments of the invention are illustrated and described herein as embodied in sorting method and apparatus, it is, nevertheless, not intended to be limited to the details shown because various modifications and structural changes may be made therein without departing from the spirit of one embodiment of the invention and within the scope and range of equivalents of the claims. The construction and method of operation of at least one embodiment of the invention, however, together with additional features and advantages thereof, will be best understood from the following description of specific embodiments when read in connection with the accompanying drawings.

BRIEF DESCRIPTION OF THE DRAWINGS

Other advantages and details of the sorting method according to at least one embodiment of the invention and devices suitable for it are found in the following explanation with reference to the drawings.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the described embodiments of the instant description, the phrase "A/B" means "A or B." For purposes of the described embodiments of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but it may. Furthermore, the terms "comprising," "including," "having," and the like, as used with respect to embodiments of the present invention, are synonymous.

Reference in the specification to the expression "common" means that the measure identified as common equally applies to all sorting criteria. The expression "common" therefore always describes commonality pertaining to all sorting criteria. Accordingly, a "common center" means that the diverting force proceeds from this common center for all products to be diverted, i.e., the products that meet one sorting criteria and the products that meet the other sorting criterion, and (if possible) the products that meet both sorting criteria. This contrasts with the prior art where the products that meet different sorting criteria are diverted by diverting forces proceeding from different centers. Because the diverting force according to at least one embodiment of the invention proceeds from such a common center, in particular the length of the path of conveyance required for sorting can be shortened since a separate force generating center does not have to be provided for each sorting criterion as before.

Reference in the specification to the expression "the path of conveyance" normally consists of one or a plurality of conveyor belts that transport the products elevated by a frame at a pleasant height for the user. The checking device with for example a weighing device and optical measuring device surrounds the conveyor belt(s). In one embodiment of the sorting device, the path of conveyance has a belt section formed by a weighing conveyor belt that is upstream from a supply belt section and downstream from a removal belt section. The weight of the transported products is measured while they are on the weighing transport belt section, and the products to be diverted are diverted at a diverting site in the removal belt section. At this side in the removal belt section, e.g. a pusher or air nozzle can be provided as a diverter. The holding section is then on the opposite side of the removal belt section. An optical measuring device can be provided at the supply belt section.

Another advantage of the described sorting method and apparatus according to at least one embodiment of the invention is that the diversion of the products to be diverted, when viewed in the direction of conveyance, occurs after the checking based on the two sorting criteria. Accordingly, there is no diversion before a check based on one of the sorting criteria that could negatively influence a corresponding check based on the other sorting criterion. If for example the check includes weighing, a diversion center before the weighing can disturb the weighing process.

In one embodiment according to the invention, the diversion occurs from a common diverting site in the path of conveyance proceeds independent of the fulfilled criterion on the basis of which the respective product is to be diverted. This allows the section of the path of conveyance used for rejection to be optimally short. In one embodiment of the method, the diversion occurs from the diverting site along a common transverse path. The paths of diversion are therefore not split according to sorting criteria which could counteract the desired shortening of the path of conveyance.

Figure 1:
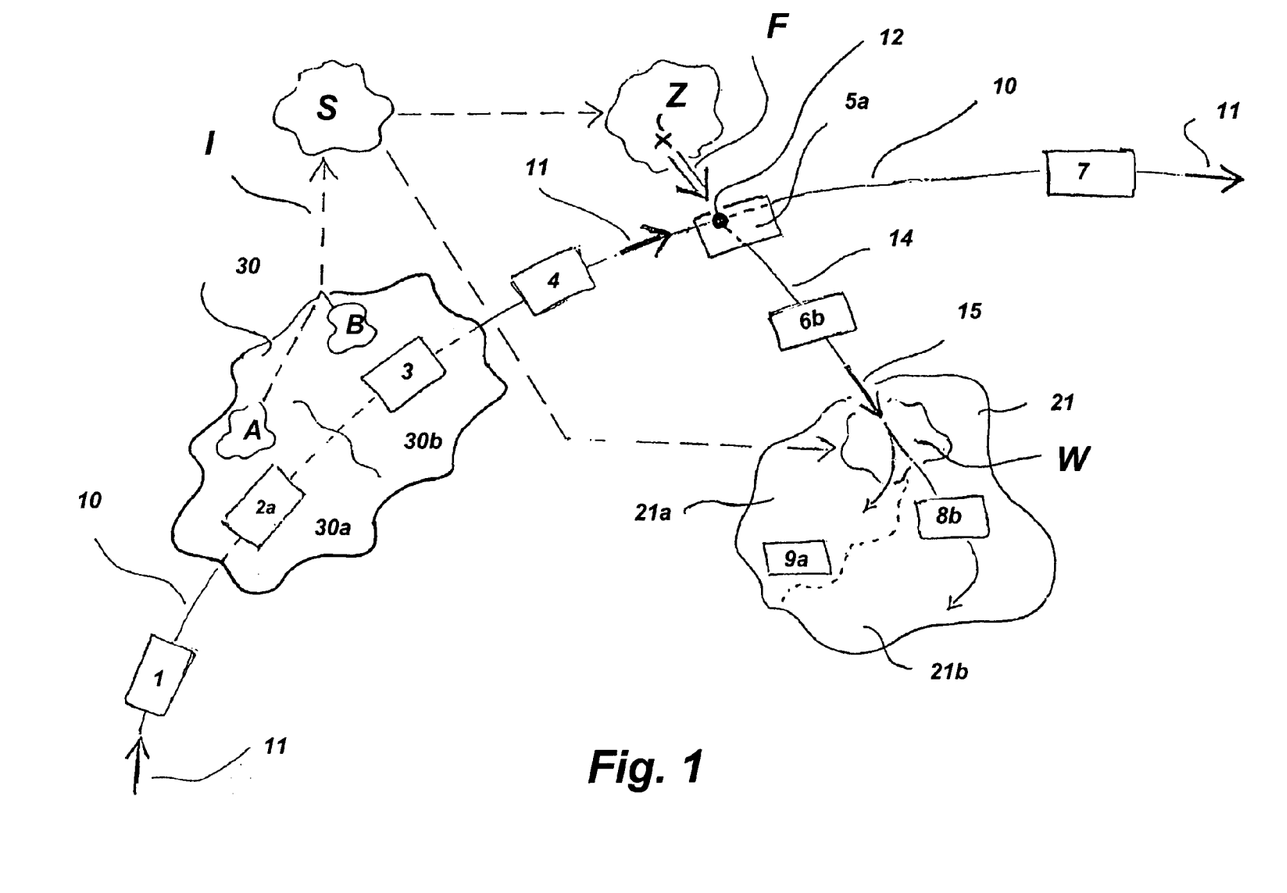
FIG. 1 shows a schematic representation of one embodiment of the sorting method according to the invention.

Referring now to FIG. 1, a schematic representation of the sorting method according to at least one embodiment of the invention is shown. In this case, nine products, 1, 2a, 3, 4 5a, 6b, 7, 8b, 9a are sorted. These products 1 to 9 are transported along a path of conveyance 10 that runs in a direction of conveyance 11. While being transported, the products are subject to a check 30. The products are checked according to two sorting criteria A and B. Product 1 in the instant in FIG. 1 is before the checking procedure, product 2a is undergoing a check 30a for criterion A that is positive in this example, whereas product 3 is undergoing a check 30b for criterion B, and the check is negative in this case.

After checking, the products are transported along the path of conveyance 10 to a common diverting site 12 in the path of conveyance 10 where they are diverted by a diverting force F perpendicular to the direction of conveyance 11 proceeding from a common center Z. The product 4 is underway to the diverting site 12, and it passes it without being diverted since the product 4 does not meet sorting criteria A or B.

Products that contrastingly meet at least one of the two sorting criteria A or B are diverted along a common transverse path 14. It can therefore be seen in FIG. 1 that product 5a was just diverted at the common diverting site 12 along the common transverse path 14, whereas product 6b is moving along the common transverse path 14 at a greater distance from the common diverting site 12. It can easily be seen that all of the diverted products are entering the common transverse path 14 independent of whether they were diverted based on sorting criterion A or sorting criterion B. The diversion is also generated by diverting force F proceeding from the common center Z. The product 7 has contrastingly passed through the diverting site 12 without being diverted since it does not meet criterion A or criterion B.

In an embodiment, the diverted products are automatically branched off from the transverse path into two separate subareas of the receiving area depending on the criterion fulfilled by the respectively diverted product. The products are therefore separated according to sorting criteria in the receiving area itself. According to one embodiment, the branchings occur sequentially in reference to a transverse direction of the transverse path. If the receiving area extends for example along the path of conveyance, a satisfactorily short extension of the receiving area along the path of conveyance is achieved. However, the branchings can be to the left and right in reference to a transverse direction of the transverse path.

Products 5a and 6b are moving along the common transverse path 14 in a transverse direction or diverted direction 15 toward a collection zone. The diverted products collect there in a common receiving area 21. The receiving area normally has a container in which the products rejected perpendicular to the direction of conveyance can be received with the help of gravity. If e.g. the height of an opening in the container is adapted to the set height of the conveyor belt; the rejected products can simply fall into the container.

Furthermore, the common receiving area 21 comprises two subareas 21a and 21b. Subarea 21a is provided to receive the products diverted because they meet sorting criterion A, and subarea 21b is provided to receive the products diverted because they meet sorting criterion B. Furthermore, the products are channeled into subareas 21a and 21b based on sorting criterion A and B. This is symbolized in FIG. 1 by a shunt W provided in the common receiving area.

At least one embodiment of the invention also relates to such a container for receiving a product rejected by a sorting device from a number of products passed through the sorting device because they meet one of at least two sorting criteria. The products can then be separated within the container according to at least one embodiment of the invention according to different sorting criteria by which they were rejected. The container according to at least one embodiment of the invention has a first chamber to receive the rejected product when the first sorting criteria is met, a second chamber, separate from the first, to receive the rejected product when a second sorting criteria is met, and a shunt controlled as a function of the sorting criteria that allows the rejected product to access the first chamber in a first operating position and blocks the access to the second chamber; in a second operating position, it allows access to the second chamber and blocks the access to the first chamber.

As shown in FIG. 1, the product 6b has almost reached the shunt W, and is being channeled after product 8b into subarea 21b of the common receiving area 21. In the situation portrayed here, the shunt W does not have to be switched since the product 8b that last passed the shunt W was rejected for the same sorting criterion as product 6b. Product 9a has passed the shunt W just before product 8b and has been channeled into subarea 21a. Correspondingly, the shunt W must be switched in order to channel product 8b. Another switchover is necessary after channeling product 6b since the subsequently diverted or rejected product 5a must be diverted based on the other fulfilled sorting criterion A.

In the embodiment of the common receiving area 21 schematically represented in FIG. 1, the shunt W sequentially channels the products with sorting criterion A and the products with sorting criterion B viewed in the direction of diversion 15. Channeling is hence sequential along the direction of diversion 15. In FIG. 1, we can easily see that the first subarea 21a is closer to the diverting site 12 than the second subarea 21b. In another embodiment of the method not sketched in FIG. 1, the shunting could also involve diverting products to the left when they fulfill criterion A and diverting products to the right when they fulfill criterion B.

In one embodiment according to the invention, the shunt can pivot an axis that is essentially parallel to the direction of gravity, and the two operating positions correspond to a left/right branching of the rejected products in reference to a plane defined by the direction running through the swivel axis and a plane defined by the direction perpendicular to the swivel axis. A container with this design is set up so that the direction perpendicular to the swivel axis corresponds to the direction from which the rejected products reach the container.

Contrastingly, in one embodiment according to the invention, the shunt swivels on an axis perpendicular to the direction of gravity, and the two operating positions correspond to a sequential branching of the rejected products in reference to a plane defined by the direction running through the swivel axis and a plane defined by the direction running perpendicular to the swivel axis. When such a container is set up so that the swivel axis is perpendicular to the direction from which the rejected products reach the container, the extension of the container can be satisfactorily small along a conveying device of a conveying path of a corresponding sorting device.

In one embodiment of the container according to the invention, the shunt is designed like an angle section where in particular the swivel axis of the shunt runs along an edge of the shunt defined by the angle section. Accordingly, a functional actuator of the shunt can be favorably combined with the geometric requirements of the shunt predetermined by the container.

All the steps of the method are controlled by a control S. The control S receives information I on the results of the checks 30, i.e. whether a product should be diverted, and also on the results of the two individual checks 30a and 30b, i.e., why the project to be diverted should be rejected. This information I is sent to shunt W for the diversion. Of course the information on whether the product should be diverted is relevant to the diversion process per se, i.e. the results of check 30, whereas the information relevant for shunt W concerns the reason for rejection.

Any type of control process can be used in the sorting method as long as it is ensured that the diverting process is controlled to divert a product to be diverted, and shunt W is caused to execute an adjusting movement, but only when the next product to be channeled needs to be channeled into a different subarea than the previously channeled product. Of course, the control commands must be correspondingly offset for the diversion and the shunt W. In the instant shown in FIG. 1 in which the control command has just been given to divert product 5a, and product 5a has just been correspondingly diverted, this means that the shunt W cannot of course yet receive the switching control command concerning product 5a for shunting products to area 21a (that last channeled product was 8b). The switch can only occur when the product 6b has also passed the unswitched shunt W. The control is accordingly synchronized, but with a correspondingly required delay.

Of course, an individual product may meet both sorting criteria A and B. In this case, the shunt is controlled so that one sorting criterion has priority over the other sorting criterion in regard to the shunt position. It is for example possible to channel such products with two faults into the subarea that is provided for receiving the products with the fault that is viewed as dominant in comparison to the other. Such a ranking can be set by the control device S. Alternately, it is also naturally conceivable to channel such products with two faults into a third subarea (not shown) of the receiving area 21.

The instant schematically represented in FIG. 1 does not necessarily correspond to a realistic instant in the actual sorting method but rather serves to explain the principle of the sorting method according to at least one embodiment of the invention. For example in contrast to the representation FIG. 1, it is not necessary for the speeds of the products being transported and diverted and the density of the products along the path of conveyance 10 to be such that two diverted products (5a, 6b) must be together on the common transverse path 14 even when they have been transported in a direct sequence on the path of conveyance 10. In particular, more than two sorting criteria and one shunt can be used with a corresponding number of positions.

In another embodiment of the method according to the invention, the diverted products are received into the receiving area by a movement generated by gravity. This allows the diverted products to be received in a satisfactory manner into a receiving area without additional required force being provided in the method.

In one embodiment of the method according to the invention, the product is weighed while it is being transported along the path of conveyance, and one of the sorting criteria is whether the measured weight deviates from a predetermined target weight. Accordingly for example, all products could be rejected and do not possess the desired weight. In particular, a tolerance for the deviation can be established, whereby the sorting criterion is only fulfilled if the measured weight exceeds the predetermined target weight beyond the tolerance.

An embodiment of the method provides a first sorting criterion of whether the measured weight exceeds the target weight, and a second criterion of whether it lies below the target weight.

In one embodiment of the method according to the inventor, a characteristic of the product shape is optically measured while the product is being transported along the path of conveyance, and one of the sorting criterion is whether the measured shape characteristic deviates from a predetermined shape characteristic. Products can accordingly be rejected whose shape does not correspond to the desired shape. In particular, products with opened or damaged product packaging can be rejected. In one embodiment of the sorting device according to the invention, the optical measuring device is located in front of the weighing device viewed in the direction of conveyance. This effectively exploits the length of the path of conveyance required for checking according to the sorting criteria since any vibrations of the transported products that could disturb a precise weighing process could attenuate somewhat.

Embodiments of the sorting method also include a control method that controls the automatic checking of the products according to various sorting criteria, the automatic diversion of the products to be diverted, and possibly the automatic branching of the products into the separate subareas according to the method.

At least one embodiment of the invention also concerns a device suitable for implementing a method, i.e. a device to sort products with a conveying device for transporting the products to be sorted along a path of conveyance in a direction of conveyance, a checking device to check the products according to at least two sorting criteria, and a diverting device by means of which the diverting force perpendicular to the direction of conveyance can be exerted on the products when they meet one of the criteria to divert the products out of the path of conveyance toward a receiving area. The diverting device has a common center from which the diverting force proceeds independent of the fulfilled criterion on the basis of which the respective product is to be diverted.

In one embodiment of the sorting device, the diverting device has just one diverter that exerts the diverting force. The diverter can for example be a pusher or air nozzle. Accordingly, at least one converter can be saved in comparison to the prior art.

The basic components for a sourcing device according to at least one embodiment of the invention, especially a conveying device, test device and diverting device, are all well-known and will not be described in greater detail. FIGS. 2 and 3 show exemplary portions of a sorting device, such as a conveyor belt 130 and a pusher 131. In the following, a first/second flaw will be discussed instead of a first/second sorting criterion, and sorted products instead of diverted products. The sorting device according to at least one embodiment of the invention includes the container. The container, which according to at least one embodiment of the invention, also has a control device that receives information from the checking device concerning whether and why a product is to be diverted, and it also sends corresponding control commands to the diverting device of the sorting device as well as the shunt of the container. The automatic shunt positioning and automatic diversion is usefully synchronized. This reliably ensures that a diverted product is also received in the intended subarea of the receiving area, i.e. in the correct chamber of the container. However, "synchronization" in this context does not mean absolutely simultaneous, instead it means synchronization with a delay that essentially corresponds to the time it takes the diverted product to pass from the diverted site in the path of conveyance to the shunt of the container.

Figure 2A:
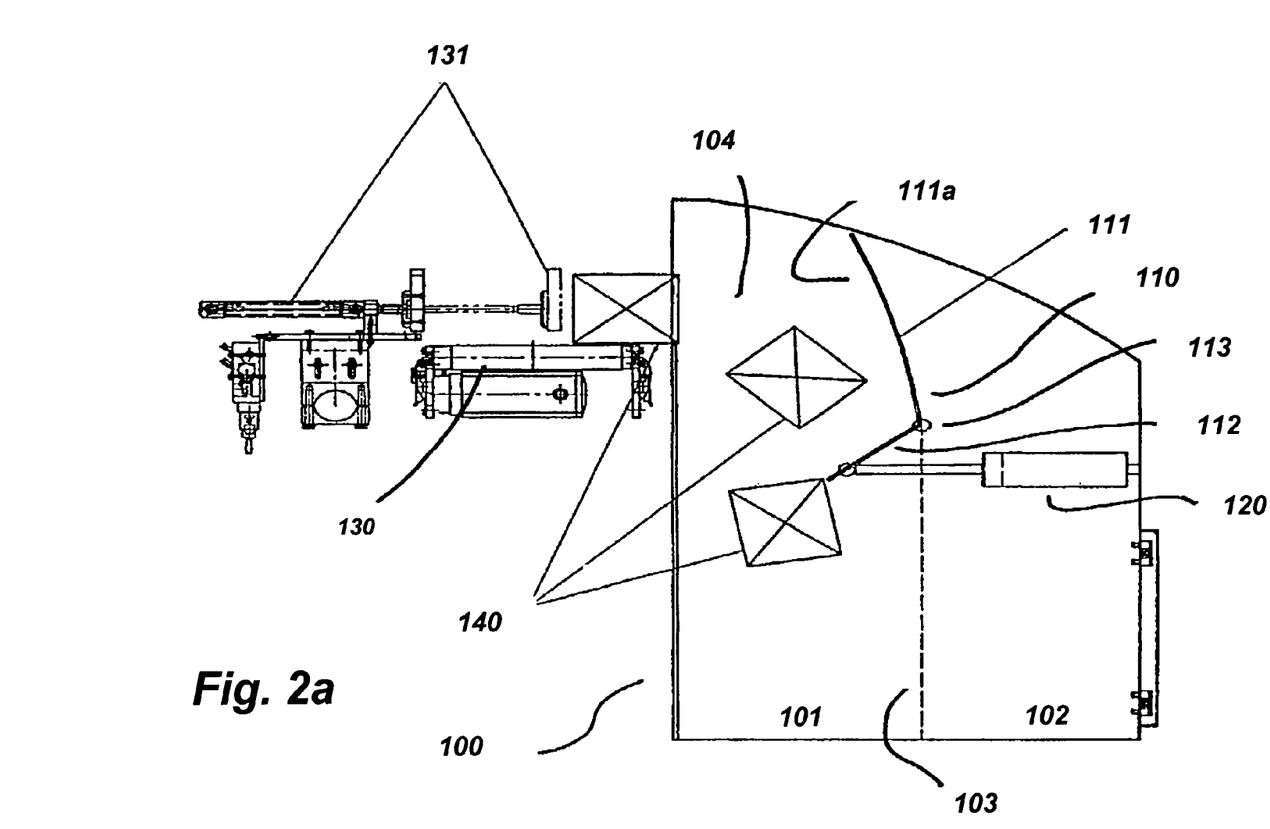
FIGS. 2a and b show a cross-sectional view, perpendicular to a direction of conveyance of a sorting device, of an embodiment of a two-chamber container, according to the invention, positioned in reference to a part of an embodiment of the sorting device according to the invention with a shunt in the container in different operating positions.
Figure 2B:
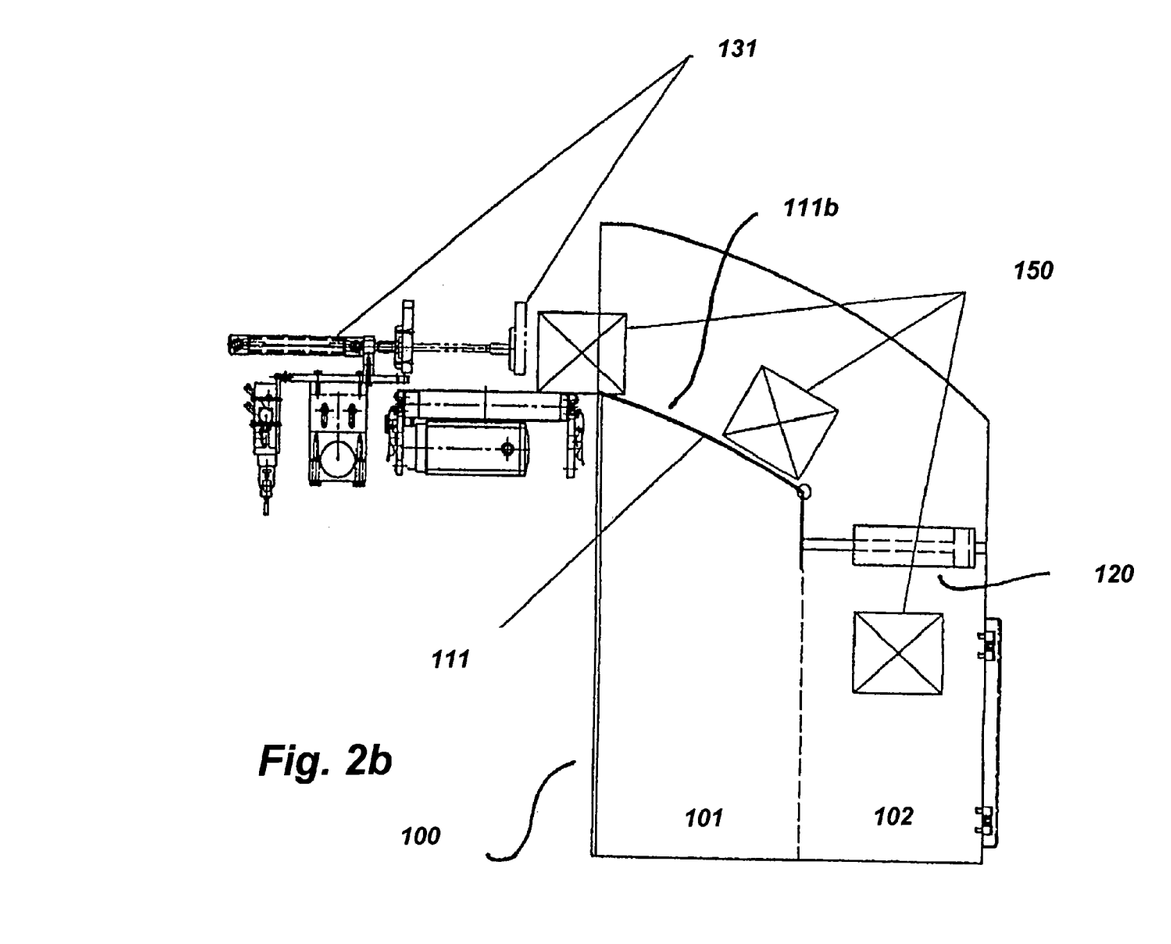

Furthermore, FIG. 2a and FIG. 2b show a two-chamber container 100 that has an essentially rectangular cross section. The inside of the container 100 is divided into two chambers 101 and 102 in the bottom area that are separate from each other, and by a dividing area 103 extending upward from the floor of the container. The first chamber 101 serves to receive rejected products with a first flaw, whereas the second chamber 102 serves to receive rejected products with a second flaw. The dividing area 103 ensures that the products with different flaws cannot mix in the container once they reach their respective chamber 101 and 102. The two-chamber container 100 is set up so that the rejected products 140, 150 reach receiving area 104 in the top of the container 100.

The position of a shunt 110 within the container 100 determines the chamber 101 or 102 that the rejected products 140, 150 enter. When the shunt is in the position portrayed in FIG. 2a, rejected products 140 are blocked from accessing chamber 102, and they enter chamber 101. Contrastingly, the shunt position shown in FIG. 2b blocks the products 150 from accessing chamber 101, and they enter chamber 102. To reach the shunt position shown in FIG. 2b from the shunt position shown in FIG. 2a, the shunt 110 can be pivoted on an axis 113 parallel to the floor. The pivot axis 113 in the container 100 setup shown in FIG. 2 is arranged with reference to a conveyor belt 130 of the sorting device so that it also runs parallel to the direction of conveyance and below the conveyor belt 130.

The main body of the shunt 110 itself has a plate-like, slightly curved flap 111. The flap 111 of the shunt 110 forms a locking and gliding area of the shunt 110. The top 111b of the flap 111 serves as a gliding base for the rejected products 150 when the shunt is in the position shown in FIG. 2b so that the products glide into the second chamber 102. Simultaneously, the flap 111 represents a bridge that bridges the first chamber 101 and accordingly prevents rejected products 150 from entering the first chamber 101.

When the shunt is in the position shown in FIG. 2a, the flap 111 blocks access to the second chamber 102. Rejected products 140 that possess enough horizontal speed by being diverted with a pusher 131 acting perpendicular to the direction of conveyance so that they can enter the second chamber 102 without the flap 111 bounce off the bottom 101a of the flap 111 and glide or fall into the second chamber 101. In one embodiment of the sorting device, the diverting device has just one diverter that exerts the diverting force. The diverter can for example be a pusher or air nozzle. Accordingly, at least one converter can be saved in comparison to the prior art.

The shunt is adjusted by means of a drive 120 coupled to the shunt. The drive 120 as shown in FIG. 2 is coupled via a lever arm 112 to the shunt 110 where the lever arm 112 is affixed to a shaft that runs along the pivot axis 113 and is firmly connected to the flap 111. The lever arm 112 and flap 111 enclose an angle of approximately 120°. The shaft extends beyond a container wall, and the lever arm 112 and drive 120 are outside the container. The adjusting mechanism is therefore not exposed to the falling rejected products or hindered by products already collected in the container. The shaft can be formed as a single piece with the flap 111, or also partly formed by an edge of the flap 111 where a section of the shaft extending outward is affixed to the flap 111. The flap 111 and the lever arm 112 can also be affixed to a rod-like shaft, for example by being welded.

In the embodiment shown in FIG. 2, the shunt is moved by a drive 120 provided as a piston/cylinder arrangement. The piston of the piston/cylinder arrangement is completely inserted when the shunt is in the position shown in FIG. 2b, and it is completely extended from the cylinder when the shunt is required to achieve the shunt position portrayed in FIG. 2a. This realization of the drive is of course only one of a plurality of possibilities for switching the shunt. For example, rotary motors can be directly coupled to the shaft corresponding to the pivot axis 113 and cause the shunt 110 to pivot by rotating. In addition, one or a plurality of drives can be provided.

Although not shown in FIG. 2, a drive 120 is coupled to a control device to control the drive. This control is nevertheless provided to control both the pusher 131 and the drive 120 offset at different times as described above.

Figure 3A:
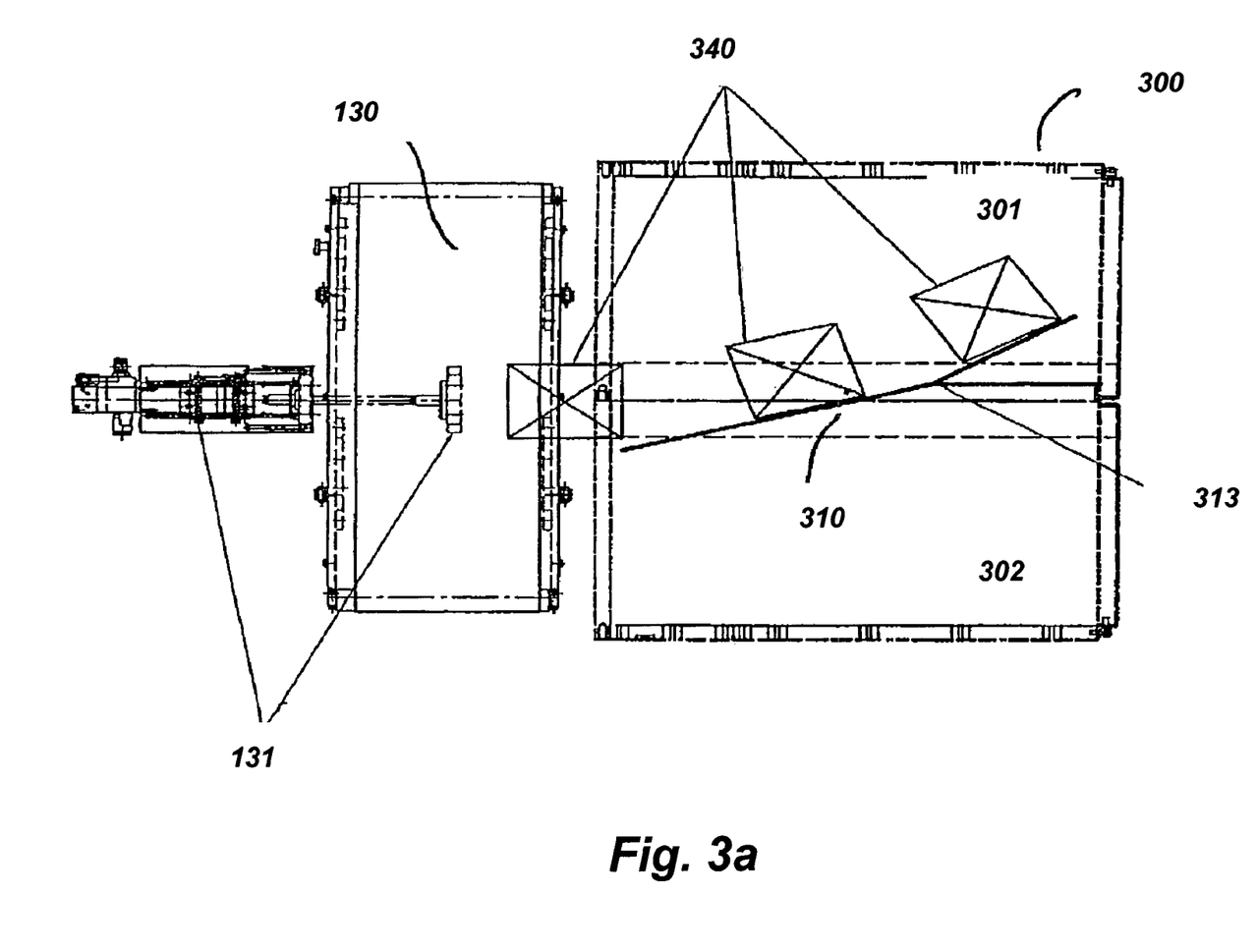
FIGS. 3a and b show a bird's-eye view of another embodiment of a two-chamber container, according to the invention, positioned with reference to a part of the sorting device with a shunt in the container in different operating positions.
Figure 3B:
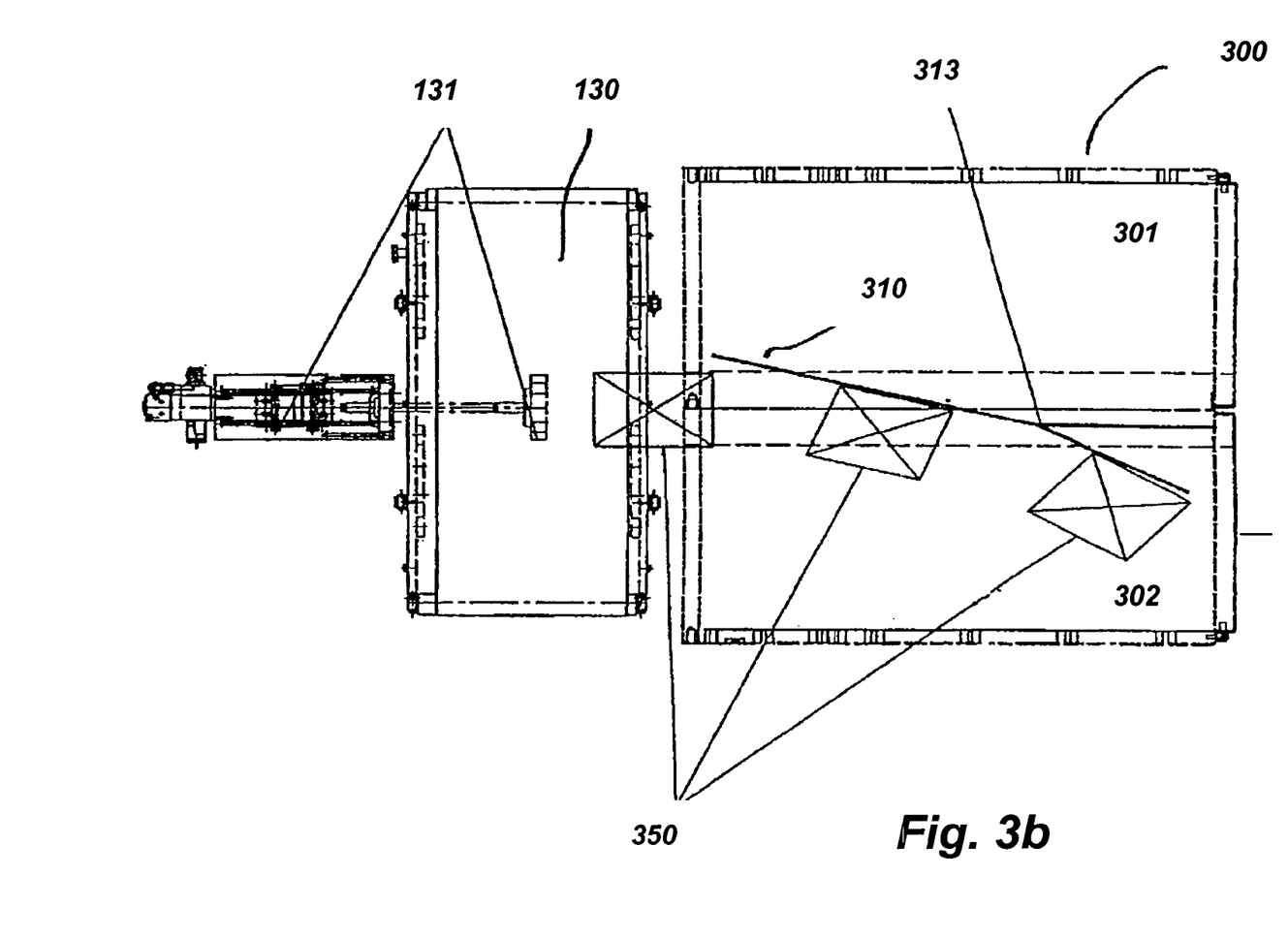

FIG. 3 shows another embodiment of a two-chamber container according to at least one embodiment of the invention. As can be easily seen from the birds-eye view, two chambers 301 and 302 of the two-chamber container 300 are arranged next to each other in the direction of conveyance of the conveyor belt 130. The diverted products 340 with a first flaw are correspondingly channeled to the left into the first chamber 301 as shown in FIG. 3a, and the rejected products 350 with the second flaw are channeled to the right into the second chamber 302 as shown in FIG. 3b. The products are channeled by an angle-section-like shunt 310 that is pivoted on a vertical axis 313. The drive for moving the shunt 310 is not shown in FIG. 3.

When comparing FIG. 2 and FIG. 3, one sees that the two-chamber container 300 shown in FIG. 3 has a simpler design but requires more space in the direction of conveyance of the conveyor belt 110 than the two-chamber container shown in FIG. 2. Depending on the initial conditions, one or the other variation may be useful.

Figure 4A:
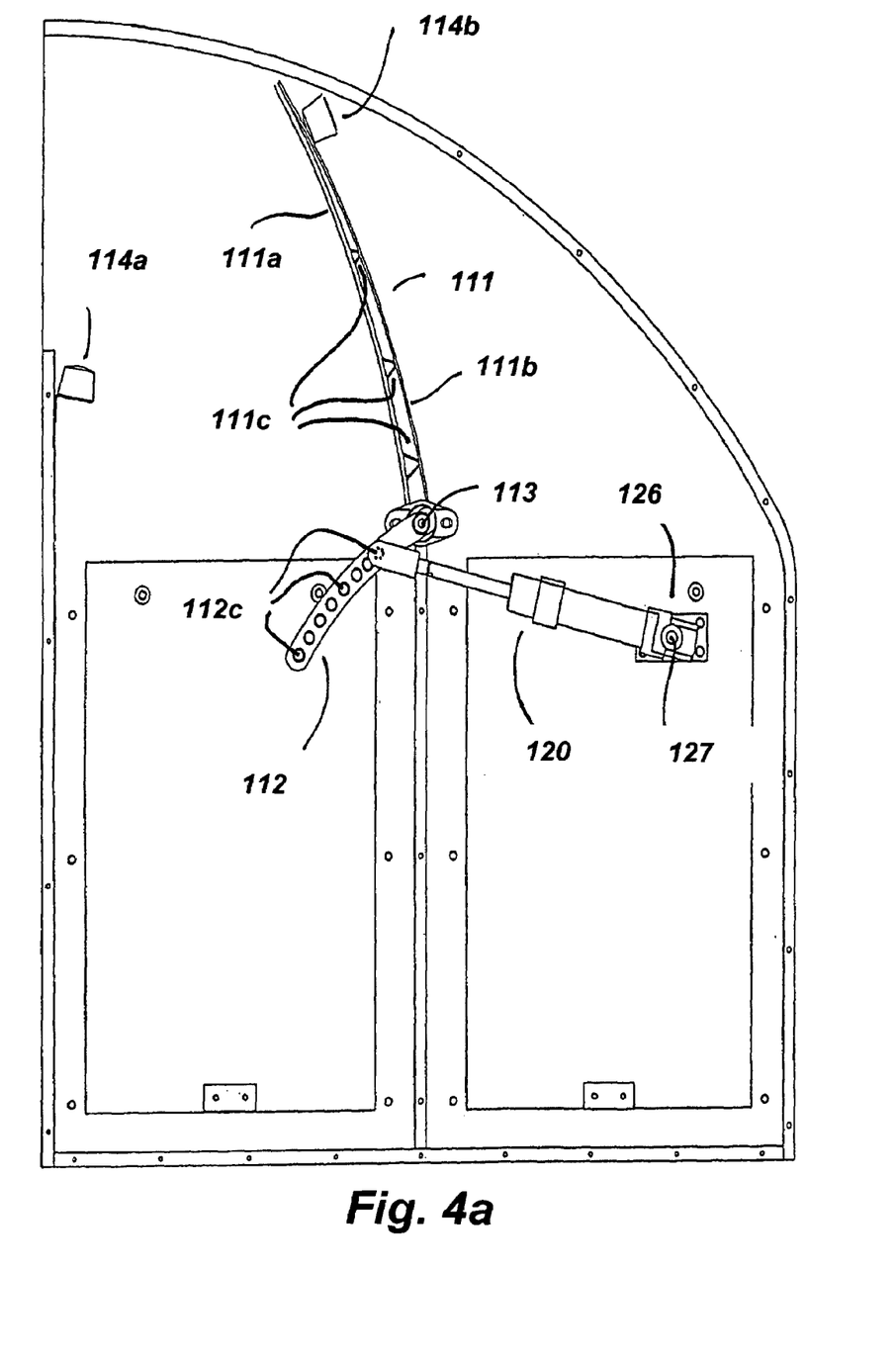
FIGS. 4a and b show an embodiment of the two-chamber container corresponding to FIGS. 2a and b with additional technical details.
Figure 4B:
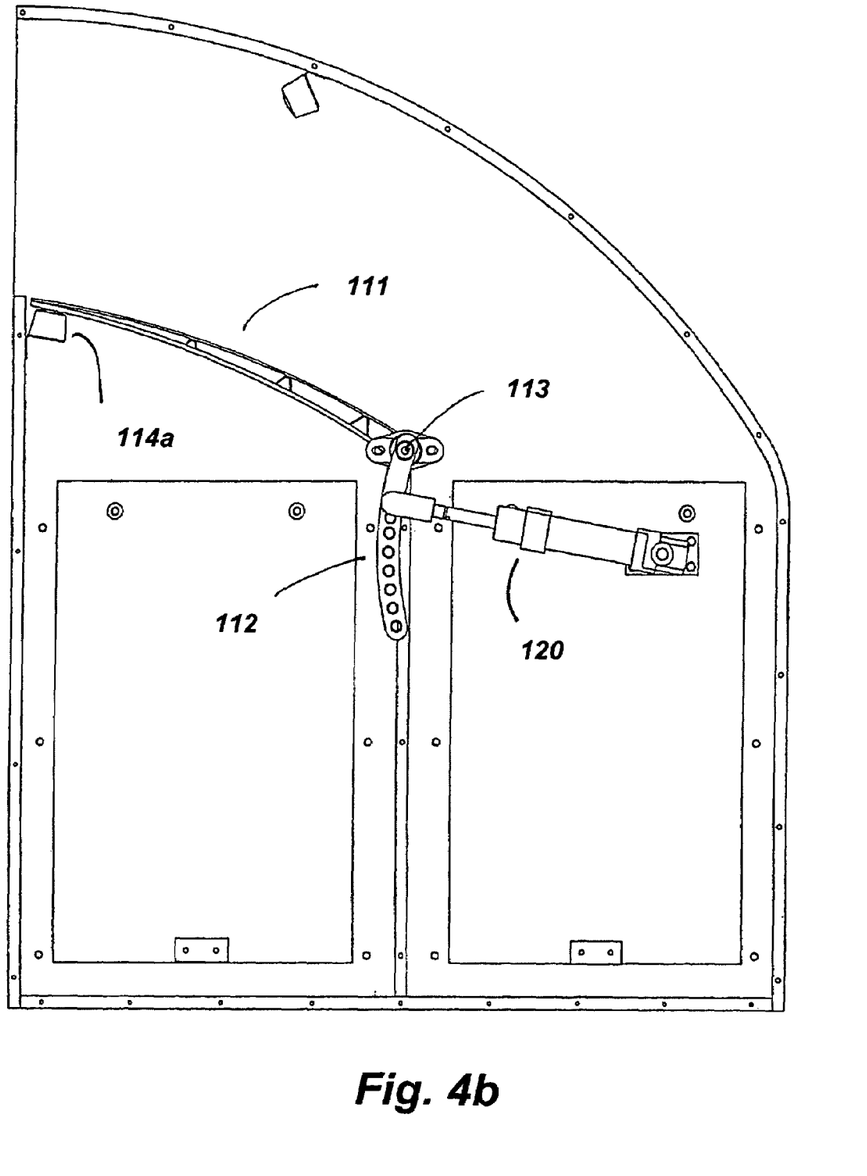

FIG. 4a and 4b show additional details of the two-chamber container according to at least one embodiment of the invention of the type shown in FIGS. 2a and b. The shunt position shown in FIG. 4a corresponds to that in FIG. 2a, and the shunt position shown in FIG. 4b corresponds to that in FIG. 2b. It can be seen that the piston-side end of the piston/cylinder arrangement 120 is affixed to an attachment area 112c of the lever arm 112; in this case, to the pivot axis 113 of the closest attachment area. At the cylinder side, the piston/cylinder arrangement 120 is permanently fixed to a container-side attachment area 126 in reference to a linear movement; however it is rotatably mounted on an axis and 27 in this area.

From the arrangement shown in FIG. 4a, we can see that the flap 111 achieves the maximum effective flap height when the piston is extended. We can see that the top 11 b of the flap 111 contacts a top stop element 114b fastened to a top area of the container. Impacts generated by products contacting the bottom 111a of the flap 111 are transmitted via the stop element 114b to the container and do not affect the drive construction. We can also see from FIG. 4a that a smaller effective flap height, i.e. height of the end of the flap 111 distant from the pivot axis 113 is achievable by fastening the piston-side end of the piston/cylinder arrangement 120 to an attachment area 112c that is further from the pivot axis 113, whereby the combination of the lever arm 112 and the flap 111 are swung somewhat counterclockwise on the pivot axis 113. By suitably selecting the attachment area 112c, the flap 111 therefore does not have to be lifted to the maximum extent when the products to be rejected are correspondingly small which places less stress on the drive.

In FIG. 4b where the bottom 111a of the flap 111 contacts the bottom stop element 114a, we can again easily recognize the principle of multiple attachment areas 112c. Following the shape of the lever arm 112, these are essentially arranged in a circular arc on a circle around the axis 127 at a radius that is determined by the length of the piston/cylinder arrangement 120 when the piston is inserted. This ensures that the position of the flap 111 shown in FIG. 4b is assumed no matter to which attachment area 112c of the lever arm 112 the piston-side end of the piston/cylinder arrangement 120 is affixed.

In one embodiment, the container has a drive that can move the shunt to assume a desired operating position. In particular, the drive has a pneumatically movable piston/cylinder arrangement in an embodiment of the container that is fastened to a housing of the container and to the shunt, especially via a lever arm to a shaft of the shunt extending toward the swivel axis. The shunt can accordingly be switched with a satisfactorily slight amount of leverage applied by the drive. In particular, the lever arm and a flap of the shunt can enclose an angle of 110° to 160°. In addition to providing satisfactory leverage for moving the shunt, the arrangement of the required components is also satisfactory.

In another embodiment of the container, the drive has a tensile actuator that contracts under pressure. This tensile actuator is a so-called artificial muscle that is constructed so that it shortens under e.g. pneumatic pressure and hence generates linear tension running in the lengthwise direction of the muscle. In addition to a few technical advantages discussed below, such an artificial muscle can generate high initial acceleration especially due to its high initial force and low mass, and it is therefore particularly suitable for achieving fast frequencies to quickly switch the shunt.

In one embodiment of the container, the lever arm has two arms, and a first tensile actuator is clamped between one arm of the lever arm and a container-side fixed point, whereas a second tensile actuator is clamped between the other arm of the lever arm and a container-side fixed point. In this manner, pneumatic pressure on the first tensile actuator generates torque in reference to the swivel axis in a first direction, and pressure on the second tensile actuator generates torque in a second direction opposite that of the first direction. A tensile actuator or artificial muscle that is not relieved after the application of pressure acts like a spring and hence counteracts the pressure on the other tensile actuator with a spring force. However, the compressed air for the two tensile actuators is advantageously controlled so that when pressure is applied to one tensile actuator, the other is relieved so that both actuators reliably function in a push-pull relationship. Since an artificial muscle manifests a spring effect even when it is relaxed, the two-arm lever arm and hence the shunt flap are as it were clamped in a pneumatic spring. Shocks from impacting products that can act on the flap are thereby captured by the artificial muscles.

The lever arm can have a plurality of attachment areas for coupling the drive. In this manner, a different effective flap opening height can be achieved merely by attaching the drive to a different attachment area. This is particularly useful when sorting products of different sizes since the flap does not have to be lifted more than necessary when the products to be sorted are correspondingly small. Of course the lever arm geometry and maximum stroke of the piston/cylinder arrangement or the maximum contraction of an artificial muscle plays a role in the calculation of the effective flap height. In this context, it is also useful when the piston/cylinder arrangement or the tensile actuator is rotatably mounted on its axis or container-side attachment points. In particular, it is useful when this axis runs parallel to the pivot axis of the shunt.

Figure 5A:
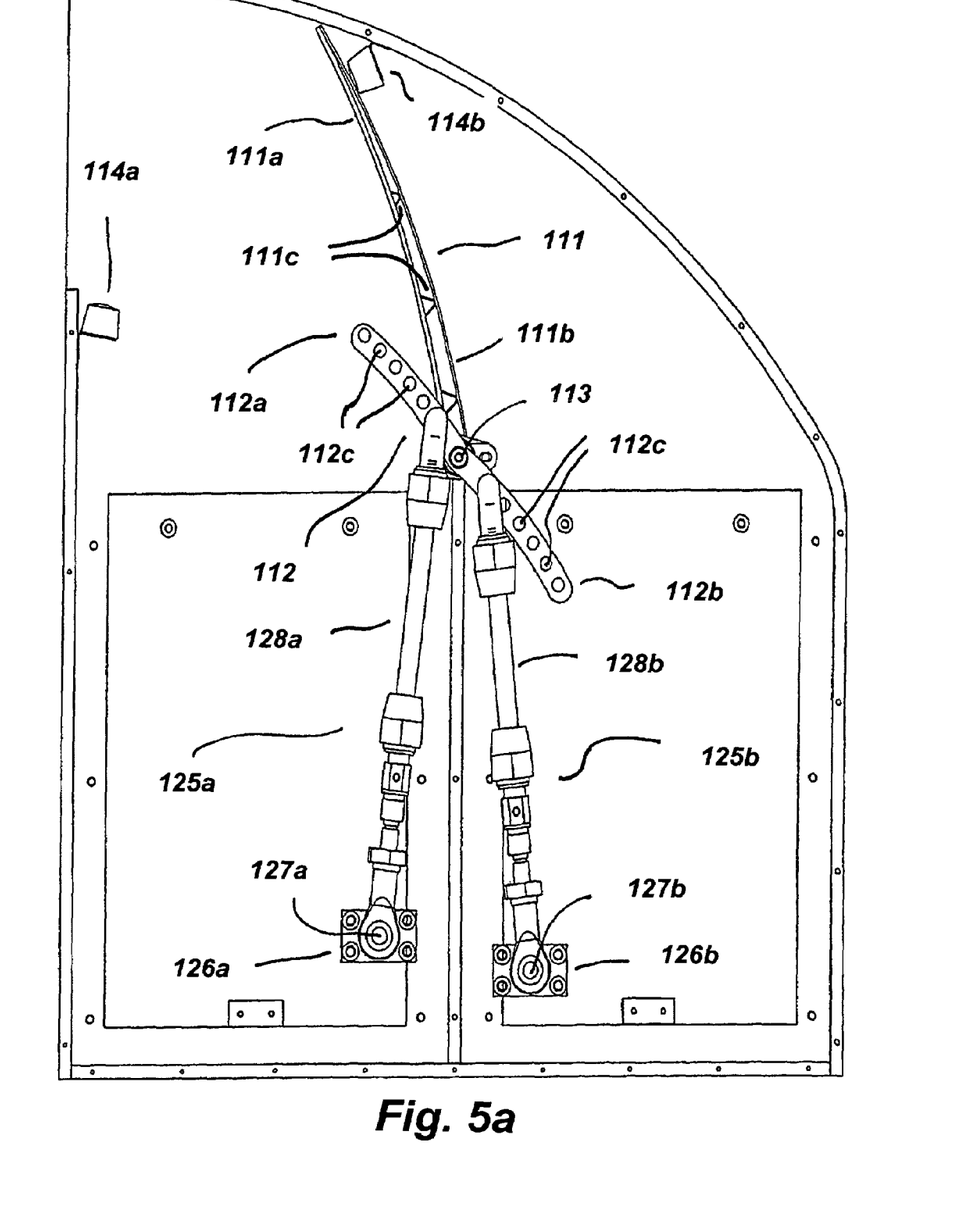
FIGS. 5a and b show another embodiment of a two-chamber container, according to the invention, with another drive system than the one in the embodiment in FIGS. 4a and b.
Figure 5B:
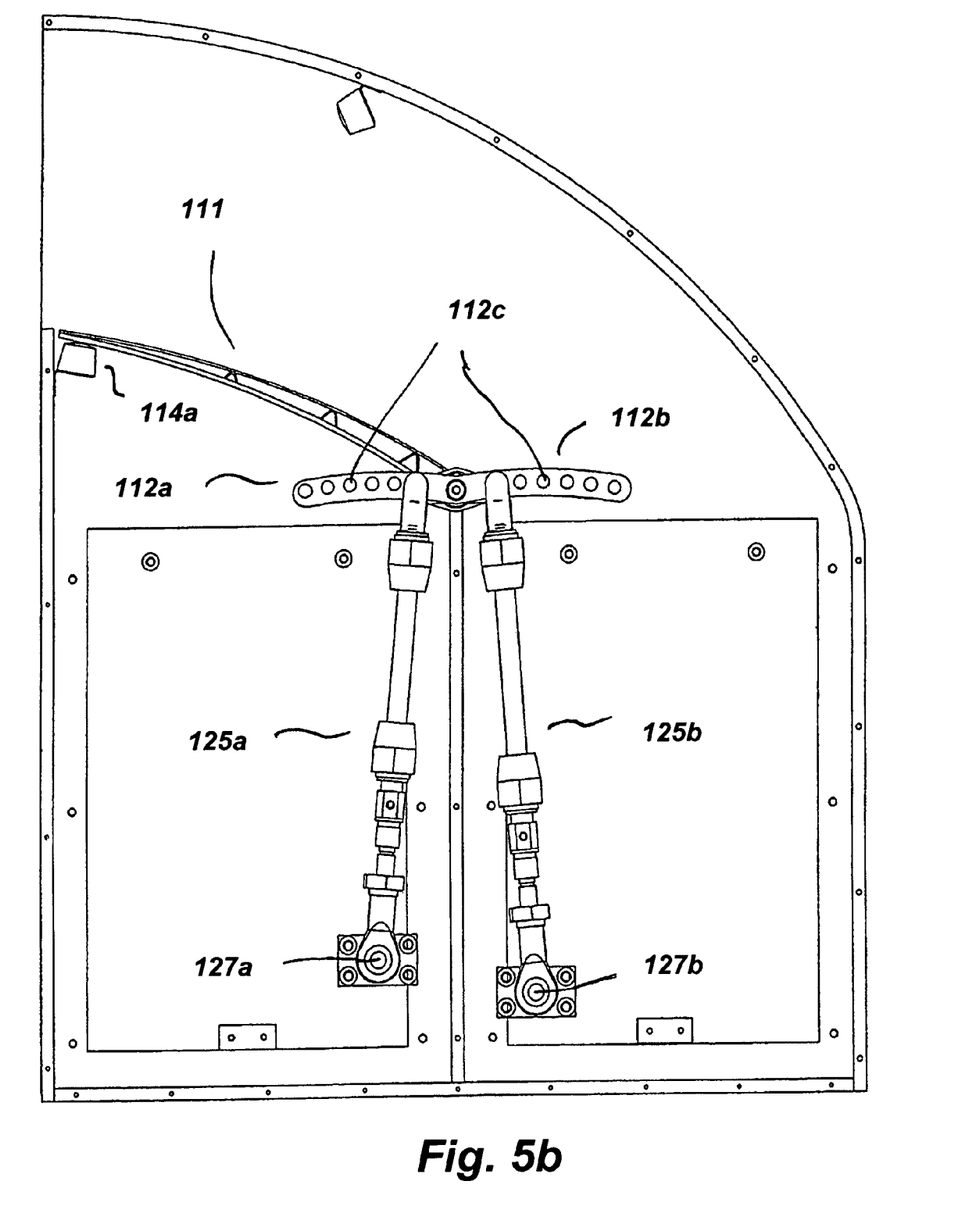

Referring now to FIGS. 5a and 5b, another type of drive to move the flap 111 is shown. One can see that the lever arm 112 has two arms, and one arm 112a extends to the left in reference to the pivot axis 113 in the direction of view in FIG. 5a and 5b, whereas arm 112b extends to the right. Attached to the end of each arm 112a, 112b of the lever arm 112 is a tensile actuator 125a, 125b, whereas the other container-side end is attached to a fixed point 126a, 126b (in reference to a linear movement). The corresponding ends of the tensile actuators 125a, 125b are rotatably mounted on axes 127a, 127b to the container-side fixed points 126a, 126b. The plurality of attachment areas 112c in combination with the rotatable mounting 127a, 127b enable the tensile actuators to be adjusted differently in reference to the two-sided lever arm 112 which has already described above in the description with reference to FIG. 4a and FIG. 4b.

According to their function, the tensile actuators are artificial muscles that have a compressible area 128a, 128b. In the situation shown in FIG. 5a, the artificial muscle 125a is relaxed, and the area 128a has a maximum length. Contrastingly, the second artificial muscle 125b is taut, and the area 128b is contracted to the maximum.

Expressed simply, the artificial muscle principal or areas 128a, 128b are tubes that compresses under pressure. A flexible tube with fluid density interacts with a web covering of fibers as reinforcement in a diamond shaped plaiting to produce a three-dimensional grid structure. An inflowing medium, preferably compressed air in this instance, peripherally deforms the grid structure giving rise to axial tension. The grid structure shortens the artificial muscle as the internal pressure rises. Reductions of approximately 25% of the initial length (nominal length) can be achieved of which approximately the first 15% makes sense in terms of energy. Tightened or relaxed, the artificial muscle also acts as a kind of spring by opposing changing external forces on the artificial muscle with a spring force.

The artificial muscle is constructed so that it only generates a tensile force. Its function is thereby substantially different from the piston/cylinder arrangement that can exert both tension and pressure. To nevertheless actively enable movement in two opposite directions, the two artificial muscles 125a section-like, 125b are employed so that they are complementary; i.e., in the drawing in FIGS. 5a and 5b, the shunt position shown in FIG. 5b is reached from the shunt position shown in FIG. 5a by applying pressure to the left artificial muscle 125a, whereas the right artificial muscle 125b is relieved of pressure. In this manner, the left artificial muscle 125a generates counterclockwise torque which the relieved right artificial muscle 125b only counteracts with a slight moment of inertia in the opposite direction. Consequently, the lever arm 112 pivots into the position shown in FIG. 5b, and the flap 111 firmly coupled to the lever arm 112 also pivots. We can clearly see in FIG. 5b that the left artificial muscle 125a and its compressible area 128a is shortened, whereas the other side 125b, 128b is relieved.

Normally, up to 8 bar of compressed air is applied to the artificial muscles generating an initial force of up to 6000 N. This high initial force yields accelerations up to $50 \, m/s^2$ given the comparatively light weight of the artificial muscle which may enable very high frequencies for switching the flap or shunt. The artificial muscle can also relax much faster than a cylinder in a piston/cylinder arrangement. A much faster frequency is therefore possible than with cylinders. In addition, the flap is clamped as it were in a pneumatic spring due to the spring effect of the artificial muscle. The flap movement can be much less abrupt since the spring effect allows the muscle to brake less abruptly. In addition, impacts against the flap that for example arise from rejected products can be captured much more gently.

Additional advantages of artificial muscles in comparison to the piston/cylinder arrangement are that the absence of moving parts prevents any stick/slip effect, and the artificial muscle is comparatively robust in the face of the external effects of dust and dirt. Hence artificial muscles can achieve comparatively longer lives.

As shown in FIGS. 4 and 5, the flap 111 is designed so that it possesses maximum rigidity and strength with minimum weight. A plate-like bottom 111a is connected to a plate-side top 111b by means of intermediate braces 111c. Since the weight of the flap is low, the acceleration of the flap movement is effectively faster, and the frequency is accordingly higher.

At least one embodiment of the invention is not restricted to the embodiments shown in the figures. The features of the various embodiments of the invention disclosed in the above description and claims can be essential to the realization of the invention in its various embodiments by themselves or in any combination.

Although specific embodiments have been illustrated and described herein, it will be appreciated by those of ordinary skill in the art and others, that a wide variety of alternate and/or equivalent implementations may be substituted for the specific embodiment shown in the described without departing from the scope of the present invention. This application is intended to cover any adaptations or variations of the embodiment discussed herein. Therefore, it is manifested and intended that the invention be limited only by the claims and the equivalents thereof.

What is claimed is:

1. A container, comprising:
a first chamber configured to receive a first product rejected by a sorting device from a plurality of products passing through the sorting device when a first sorting criteria is met;
a second chamber, separate from the first chamber, configured to receive a second product rejected by the sorting device from the plurality of products passing through the sorting device when a second sorting criteria is met; and
a shunt, coupled to the first chamber and to the second chamber, having a first operating position and a second operating position, the shunt configured to control, as a function of the first and second sorting criteria, access to the first chamber and block access to the second chamber by the first rejected product in the first operating position and to control access to the second chamber and block access to the second chamber by the second rejected product in the second operating position; and
a drive configured to move the shunt to assume a desired operating position, wherein the drive includes a tensile actuator that compresses under pressure.

2. The container according to claim 1, wherein the shunt is pivotable on a swivel axis that is essentially parallel to the direction of gravity, and the two operating positions of the shunt correspond to a left/right branching of the rejected products in reference to a plane defined by the direction running through the swivel axis and a plane defined by the direction perpendicular to the swivel axis.

3. The container according to claim 2, wherein the swivel axis of the shunt runs along an edge of the shunt defined by an angle section.

4. The container according to claim 1, wherein the shunt is pivotable on a swivel axis that is perpendicular to the direction of gravity, and the two operating positions of the shunt correspond to a sequential branching of the rejected products in reference to a plane defined by the direction running through the swivel axis and a plane defined by the direction perpendicular to the swivel axis.

5. The container according to claim 4, wherein the swivel axis of the shunt runs along an edge of the shunt defined by an angle section.

6. The container according to claim 1, wherein the tensile actuator is rotatably mounted on an axis that runs parallel to a pivot axis.

7. The container according to claim 1, wherein the drive is coupled to the shunt by means of a lever arm contacting the shaft of the shunt that extends in the direction of the swivel axis.

8. The container according to claim 7, wherein the lever arm has two arms, a first tensile actuator is clamped between one arm of the lever arm and a container-side fixed point, and a second tensile actuator is clamped between the other arm of the lever arm and a container-side fixed point so that pressure on the first tensile actuator generates torque in reference to the swivel axis in a first direction, and pressure on the second tensile actuator generates torque in a second direction opposite that of the first direction.

9. The container according to claim 7, wherein the lever arm has several attachment areas for coupling to the drive.

10. The container according to claim 1, further comprising another tensile actuator, the tensile actuator and the another tensile actuator configured to be complementary to control movement of the shunt in opposing directions.

11. A container, comprising:
a first chamber configured to receive a first product rejected by a sorting device from a plurality of products passing through the sorting device when a first sorting criteria is met;
a second chamber, separate from the first chamber, configured to receive a second product rejected by the sorting device from the plurality of products passing through the sorting device when a second sorting criteria is met;
a shunt, coupled to the first chamber and to the second chamber, having a first operating position and a second operating position, the shunt configured to control, as a function of the first and second sorting criteria, access to the first chamber and block access to the second chamber by the first rejected product in the first operating position and to control access to the second chamber and block access to the second chamber by the second rejected product in the second operating position; and
a drive configured to move the shunt to assume a desired operating position, wherein the drive includes a first and a second tensile actuator that each compresses under pressure, wherein the drive is coupled to the shunt by means of a lever arm contacting the shaft of the shunt that extends in the direction of the swivel axis, wherein the lever arm has two arms, the first tensile actuator is clamped between one arm of the lever arm and a container-side fixed point, and the second tensile actuator is clamped between the other arm of the lever arm and a container-side fixed point so that pressure on the first tensile actuator generates torque in reference to the swivel axis in a first direction, and pressure on the second tensile actuator generates torque in a second direction opposite that of the first direction.

12. The container according to claim 11, wherein the shunt is pivotable on a swivel axis that is essentially parallel to the direction of gravity, and the two operating positions of the shunt correspond to a left/right branching of the rejected products in reference to a plane defined by the direction running through the swivel axis and a plane defined by the direction perpendicular to the swivel axis.

13. The container according to claim 12, wherein the swivel axis of the shunt runs along an edge of the shunt defined by an angle section.

14. The container according to claim 11, wherein the shunt is pivotable on a swivel axis that is perpendicular to the direction of gravity, and the two operating positions of the shunt correspond to a sequential branching of the rejected products in reference to a plane defined by the direction running through the swivel axis and a plane defined by the direction perpendicular to the swivel axis.

15. The container according to claim 14, wherein the swivel axis of the shunt runs along an edge of the shunt defined by an angle section.

16. The container according to claim of 11, wherein the tensile actuator is rotatably mounted on an axis that runs parallel to a pivot axis.

17. The container according to claim 11, wherein the lever arm has several attachment areas for coupling to the drive.

* * * * *